(12) United States Patent
Ku et al.

(10) Patent No.: US 7,971,177 B2
(45) Date of Patent: Jun. 28, 2011

(54) DESIGN TOOL FOR CHARGE TRAPPING MEMORY USING SIMULATED PROGRAMMING OPERATIONS

(75) Inventors: Shaw Hung Ku, Taipei (TW); Chia Wei Wu, Jhubei (TW); Ming Shang Chen, Hsinchu (TW); Wenpin Lu, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 502 days.

(21) Appl. No.: 12/182,352

(22) Filed: Jul. 30, 2008

(65) Prior Publication Data
US 2009/0276737 A1    Nov. 5, 2009

Related U.S. Application Data

(60) Provisional application No. 61/050,377, filed on May 5, 2008.

(51) Int. Cl.
*G06F 17/50*    (2006.01)

(52) U.S. Cl. .............. 716/136; 716/115; 703/13

(58) Field of Classification Search .................. None
See application file for complete search history.

(56) References Cited

U.S. PATENT DOCUMENTS
6,912,163 B2   6/2005 Zheng et al.

OTHER PUBLICATIONS

Gu et al., "Extraction of nitride trap density from stress induced leakage current in silicon-oxide-nitride-oxide-silicon flash memory," Applied Physics Letters 89, 163514 (2006), 3 pages.*

Gu et al., "Numerical Simulation of Bottom Oxide Thickness Effect on Charge Retention in SONOS Flash Memory Cells," IEEE Trans. on Electron Devices, vol. 54, No. 1, Jan. 2007, pp. 90-97.*

Hasnat et al., "Thermionic Emission Model of Electron Gate Current in Submicron NMOSFETs," IEEE Trans. on Electron Devices, vol. 44, No. 1, Jan. 1997, pp. 129-138.*

Manzini, "Electronic processes in silicon nitride," Journal of Applied Physics, vol. 62, No. 8, Oct. 15, 1987, pp. 3278-3284.*

Wang et al., "An analytical retention model for SONOS nonvolatile memory devices in the excess electron state," Solid State Electronics, 2009, pp. 97-107.*

Paul, A., et al., "Comprehensive Simulation of Program, Erase and Retention in Charge Trapping Flash Memories," IEEE IEDM Dec. 11-13, 2006, 4 pages.

Robertson, John, "Band offsets of wide-band-gap oxides and implications for future electronic devices," J. Vac. Sci, Technol. B 18(3), May/Jun. 2000, 7 pages.

Lee, Chang Hyun, et al., "A Novel SONOS Structure of SiO2/SiN/Al2O3 with TaN metal gate for multi-giga bit flash memeries," IEEE IEDM 2003, 4 pages.

(Continued)

*Primary Examiner* — Leigh Marie Garbowski
(74) *Attorney, Agent, or Firm* — Haynes Beffel & Wolfeld LLP

(57) ABSTRACT

A method for simulating operation of a charge trapping memory cell which computes the amount of charge trapped by determining first tunneling current through the tunneling layer, determining second tunneling current out of the charge trapping layer to the gate, determining third tunneling current escaping from traps in the charge trapping layer and tunneling out to the gate, and integrating said tunneling currents over a time interval. A change in threshold voltage can be computed for a transistor including the charge trapping structure. The parameter set can include only physical parameters, including layer thickness, band offsets and dielectric constants.

20 Claims, 12 Drawing Sheets

OTHER PUBLICATIONS

Furnemont, A., et al., "Physical Understanding of SANOS Disturbs and VARIOT Engineered Barrier as a Solution," IEEE 2007 2 pages.

Fu, J., et al., "Trap Layer Engineered Gate-All-Around Vertically Stacked Twin Si-Nanowire Nonvolatile Memory," IEEE 2007, 4 pages.

Furnemont, A., et al., "A Consistent Model for the SANOS Programming Operation," 2007 IEEE, 2 pages.

Wang, Tahui, et al., "Reliability Models of Data Retention and Read-Disturb in 2-bit Nitride Storage Flash Memory Cells," IEEE IEDM 2003, 4 pages.

Wang, Ying Qian, et al., "Electrical Characteristics of Memory Devices with a High-k HfO2 Trapping Layer and Dual SiO2/Si3N4 Tunneling Layer," IEEE Transactions on Electron Devices, vol. 54, No. 10, Oct. 2007, 7 pages.

Bachhofer, H., et al., "Transient conduction in multidielectric silicon-oxide-nitride-oxide semiconductor structures," J. Appl. Phys. v. 89, No. 5, Mar. 1, 2001, 10 pages.

Lee, C.H., et al., "Numerical Simulation of Programming Transient Behavior in Charge Trapping Storage Memory," IEEE Intl. Conf. on Memory Technology and Design, Non-Volatiel Semiconductor Memory Workshop, May 18-22, 2008, 2 pages.

* cited by examiner

DESIGN TOOL FOR CHARGE TRAPPING MEMORY USING SIMULATED PROGRAMMING OPERATIONS

CROSS-REFERENCE TO RELATED APPLICATION

The benefit is claimed of the U.S. Provisional Application No. 61/050,377, filed 5 May 2008.

BACKGROUND OF THE INVENTION

1. Field of the Invention

The present invention relates to automated design tools for integrated circuit, charge trapping memory devices.

2. Description of Related Art

The design of SONOS type memory devices, which are based on dielectric charge trapping structures, involves complex tradeoffs among parameters that are not well understood. Thus, suitable tools for simulating such devices have not been developed.

For example, while the erase speed of a SONOS type device could be significantly improved by using a high-κ blocking layer, where κ is the dielectric constant, and a metal gate with a high work function (C. H. Lee et al., IEDM Tech. Dig., pp. 613-616, 2003), program saturation becomes a problem. So to counter the program saturation problem, a programming high voltage is necessary to achieve either a fast program speed or a large memory window in such devices. The loss of injected electrons through the blocking layer is highly suspected as a cause of lower program saturation levels, as described in Furnemont et al., NVSMW, pp 94-95, 2007, and J. Fu et al., IEDM Tech. Dig., pp. 79-82, 2007. Therefore, reducing the overall thickness of the charge trapping layer, or a band-engineered process, becomes necessary, causing other tradeoffs in performance or cost of manufacturing. To optimize these tuning concepts, a comprehensive understanding of device programming (PGM), erasing and read disturb behaviors is necessary. Although many transport theories have been proposed in Paul et al., IEDM Tech. Dig., December, 2006, Furnemont et al., NVSMW, pp 96-97, 2007, and possibly others, a consistent model illustrating programming, erasing and read disturb behaviors in charge trapping memory cells is not available.

Therefore, it is desirable to provide a consistent programming model and a simulator based on such model for use in an integrated circuit design tool.

SUMMARY OF THE INVENTION

A computer implemented method for simulation of charge trapping in a charge trapping structure, having a tunneling layer, a charge trapping layer and a blocking layer, is described that includes storing in a machine readable medium a parameter set characterizing materials and thicknesses of the tunneling layer, a charge trapping layer and blocking layer, and computing charge trapped in the charge trapping layer as a function of the parameter set. The charge trapped in the charge trapping layer is computed by determining first tunneling current through the tunneling layer, determining second tunneling current out of the charge trapping layer to the gate, determining third tunneling current escaping from traps in the charge trapping layer and tunneling out to the gate, and integrating said tunneling currents over a time interval. A change in threshold voltage can be computed for a transistor including the charge trapping structure using the computed charge trapped. The parameter set can include only physical parameters, including a first band offset between the substrate and the tunneling layer, a second band offset between the charge trapping layer and the tunneling layer, and a third band offset between the charge trapping layer and the blocking layer.

The process can be extended to include iteratively computing the amount of charge trapped while changing a selected parameter in the parameter set, such as programming voltage, band offset, material choice, thickness of layers and so on, to characterize results of changing the selected parameter on charge trapping. Also, using the processes described herein, the charge trapped is computed while applying a constant charge centroid position having location within the charge trapping layer.

The simulation process also is able to select a tunneling mechanism to be applied in determining the first tunneling current in response to the parameter set. For simulation of a typical charge trapping structure, the simulation program includes logic for selecting, in response to a thickness of the tunneling layer, band offset between the tunneling layer and a substrate, a band offset between the tunneling layer and the charge trapping layer, and a magnitude of an electric field in the tunneling layer, one of a Fowler-Nordheim tunneling mechanism, a direct tunneling mechanism and a modified Fowler-Nordheim tunneling mechanism to be applied in determining the first tunneling current.

The technology can be implemented as a method for simulating charge trapping behavior, as a design tool, and as an article of manufacture comprising a data storage medium storing a computer program including instructions for implementation of the process, as described in more detail below. Simulation of programming, erasing and read disturb behaviors can be applied to design optimization for the structure of a charge trapping memory cell.

Other aspects and advantages of the present invention can be seen on review of the drawings, the detailed description and the claims, which follow.

DETAILED DESCRIPTION

A detailed description of embodiments of the present invention is provided with reference to the FIGS. 1-13.

Figure 1:
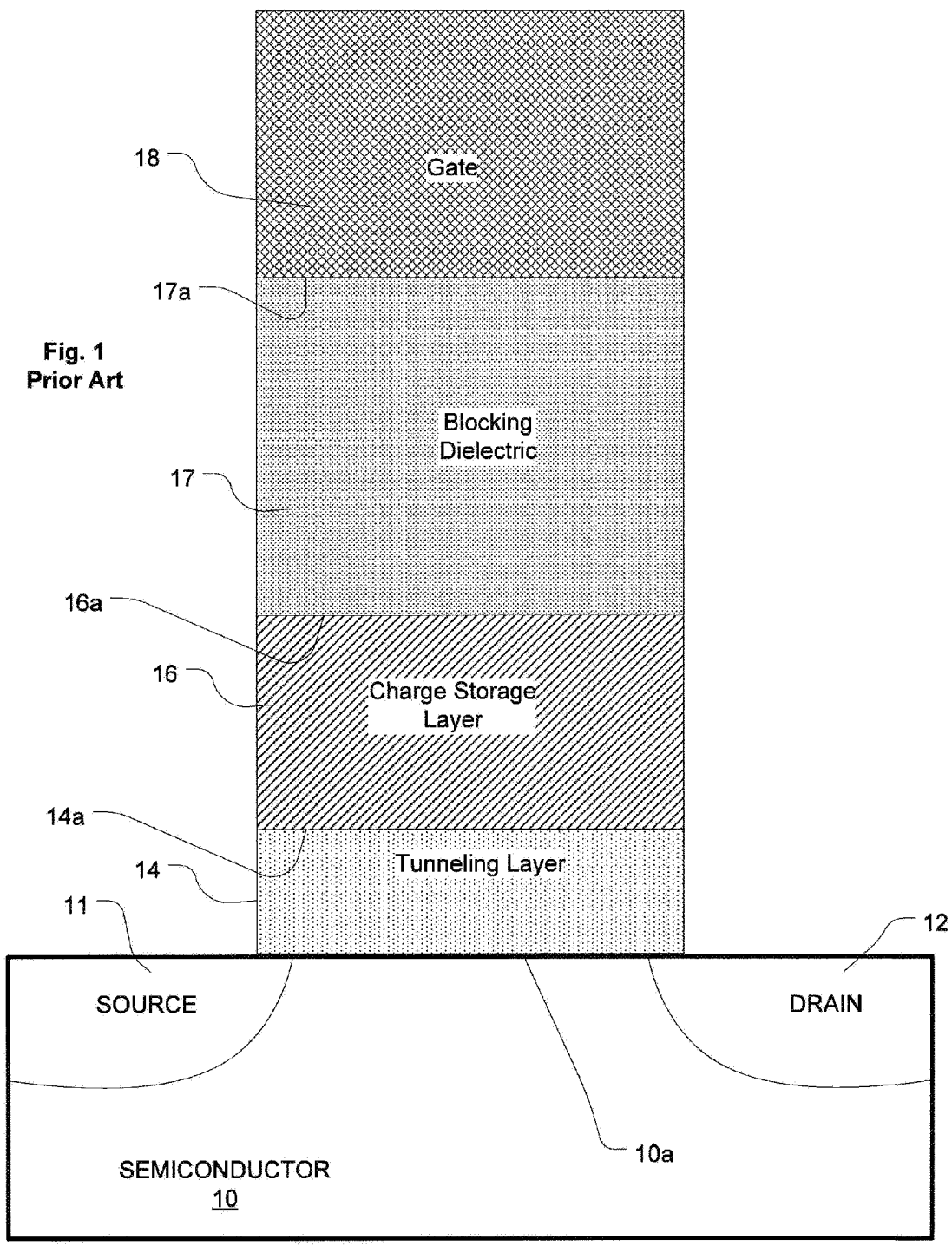
FIG. 1 is a diagram of a basic charge trapping memory cell known in the prior art.

FIG. 1 is a simplified diagram of a charge trapping memory cell typical of the state of the art, for which a design tool and process for simulation is described herein.

The memory cell includes a channel in a semiconductor body on substrate 10, a source 11 and a drain 12 adjacent the channel. A gate 18 is implemented using n-type or p-type polysilicon, or using metals or metal compounds, such as platinum, tantalum nitride, aluminum or other metal or metal compound gate materials. It is preferable to use materials having work functions higher than 4.5 eV. A variety of high work function materials suitable for use as a gate terminal are described in U.S. Pat. No. 6,912,163. Embodiments of the memory cell can also employ other metals, such as aluminum, having a work function of about 4.3 eV.

In the embodiment illustrated in FIG. 1, the dielectric tunneling layer 14 comprises silicon dioxide. Other tunneling materials may be used as well. In an alternative, a bandgap engineered tunneling layer may be used which is composed of a composite of materials. A charge trapping layer 16 in this embodiment comprises silicon nitride having a thickness within the range of about 50 Å to 100 Å, including for example about 70 Å in one embodiment. Other charge trapping materials and structures may be employed, including for example silicon oxynitride ($Si_xO_yN_z$), silicon-rich nitride, silicon-rich oxide, high-κ dielectrics, and other trapping layer structures including embedded nano-particles and so on.

The blocking dielectric layer 17 in typical embodiments comprises silicon dioxide, having a dielectric constant κ of about 3.9. In other embodiments, the blocking layer comprises aluminum oxide ($Al_2O_3$), having a dielectric constant κ of about 8 or more, or other high κ dielectric material such as hafnium oxide ($HfO_2$) having a κ of about 10, titanium oxide ($TiO_2$) having a κ of about 60, praseodymium oxide ($Pr_2O_3$) having a κ of about 30. Oxides of zirconium Zr and lanthanum La may used as well. In some embodiments, oxides of more than one metal may be used, including for example, oxides of hafnium and aluminum, oxides or zirconium and aluminum, and oxides of hafnium, aluminum and zirconium. The layer 17 may typically be within the range of about 50 Å to 150 Å. Band gaps and band offsets for a variety of materials usable for tunneling layers, charge trapping layers and blocking layers are described in Robertson, "Band Offsets of Wide-Band-Gap Oxides" J. Vac. Sci. Technol. B, Vol. 18, No. 3, May/June 2000, pp. 1785-1791, which is incorporated by reference.

FIG. 1 also shows, for reference, interface 10a between the substrate 10 and the tunneling layer 14, interface 14a between the tunneling layer and the charge trapping layer 16, interface 16a between the charge trapping layer and the blocking layer 17, and interface 17a between the blocking layer and the gate. Tunneling currents correlate with band offsets at these interfaces that are characteristic of the materials used for the various layers.

Figure 2:
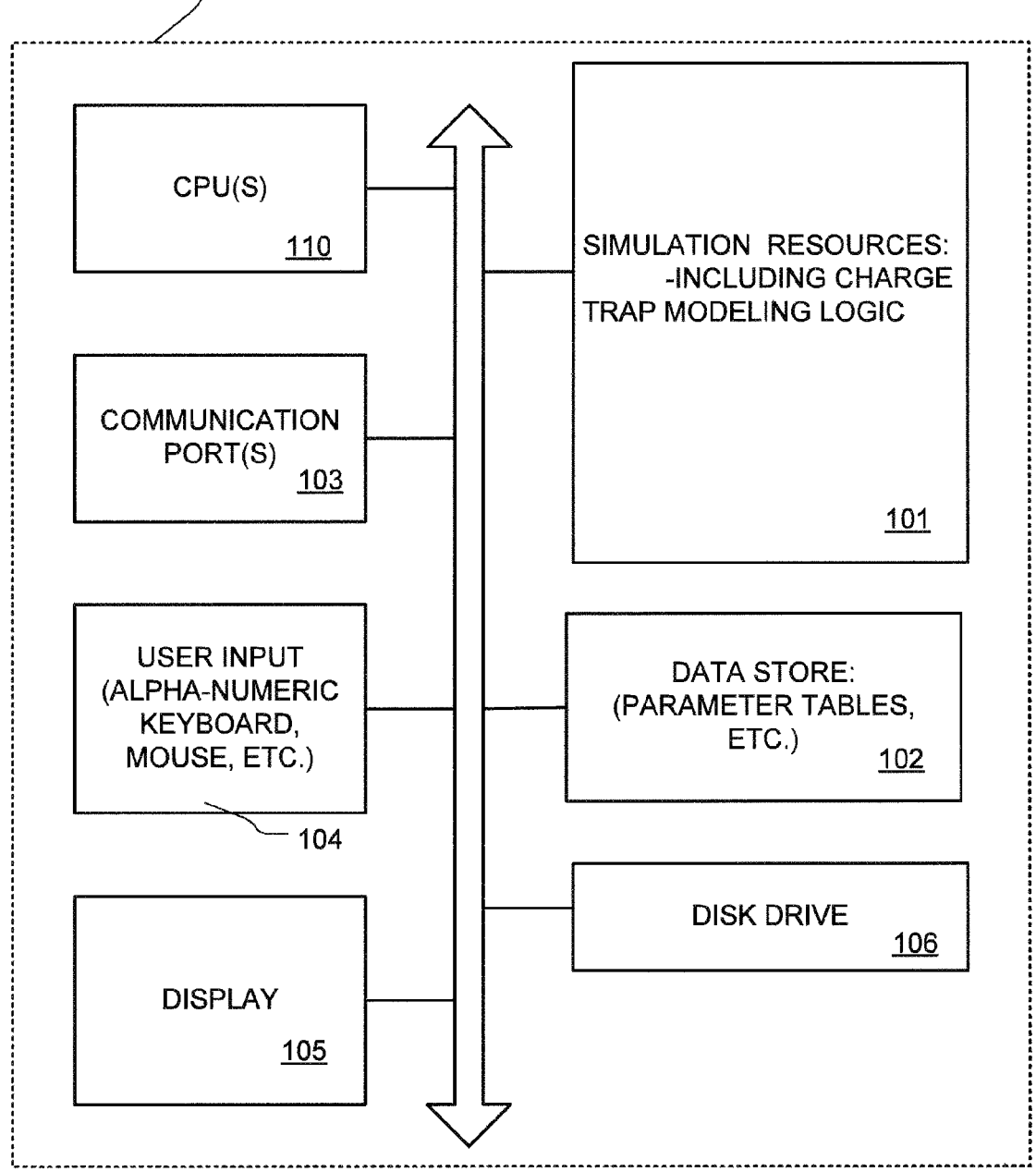
FIG. 2 is a block diagram of a computer implemented design tool including resources for executing a simulation process as described herein.

FIG. 2 is a simplified block diagram of a data processing system 100 arranged as an electronic design automation/simulation system implementing the charge trapping cell modeling technology described herein. The system 100 includes one or more central processing units 110, which are arranged to execute computer programs stored in program memory 101, access a data store 102, access large-scale memory such as a disk drive 106, and to control communication ports 103, user input devices 104, and a display 105. Electronic design automation systems as represented by FIG. 1 include a single workstation, and networks of computers utilized by designers of integrated circuits.

The electronic design automation uses data processing resources including logic implemented as instructions in computer programs stored in memory 101 for an exemplary system. The simulation tool can be implemented by a computer program stored in memory 101, or in other memory that can be distributed separately from the computer system, as an article of manufacture. In alternatives, the logic can be implemented using computer programs in local or distributed machines, and can be implemented in part using dedicated hardware or other data processing resources. The logic in a representative electronic design automation system includes memory cell optimization tools as described herein, logic design tools, design verification tools, synthesis tools, placement tools, routing tools, physical verification tools and so on.

The data store 102 is typically used for storing machine-readable definitions of devices to be simulated and designed. Large-scale memory is used to store physical parameter libraries which include definitions of components and materials used for implementation of the charge trapping memory cells. Components in the cell library include tables of parameter sets that are utilized in the simulation, and design tools as described in more detail below.

Figure 3:
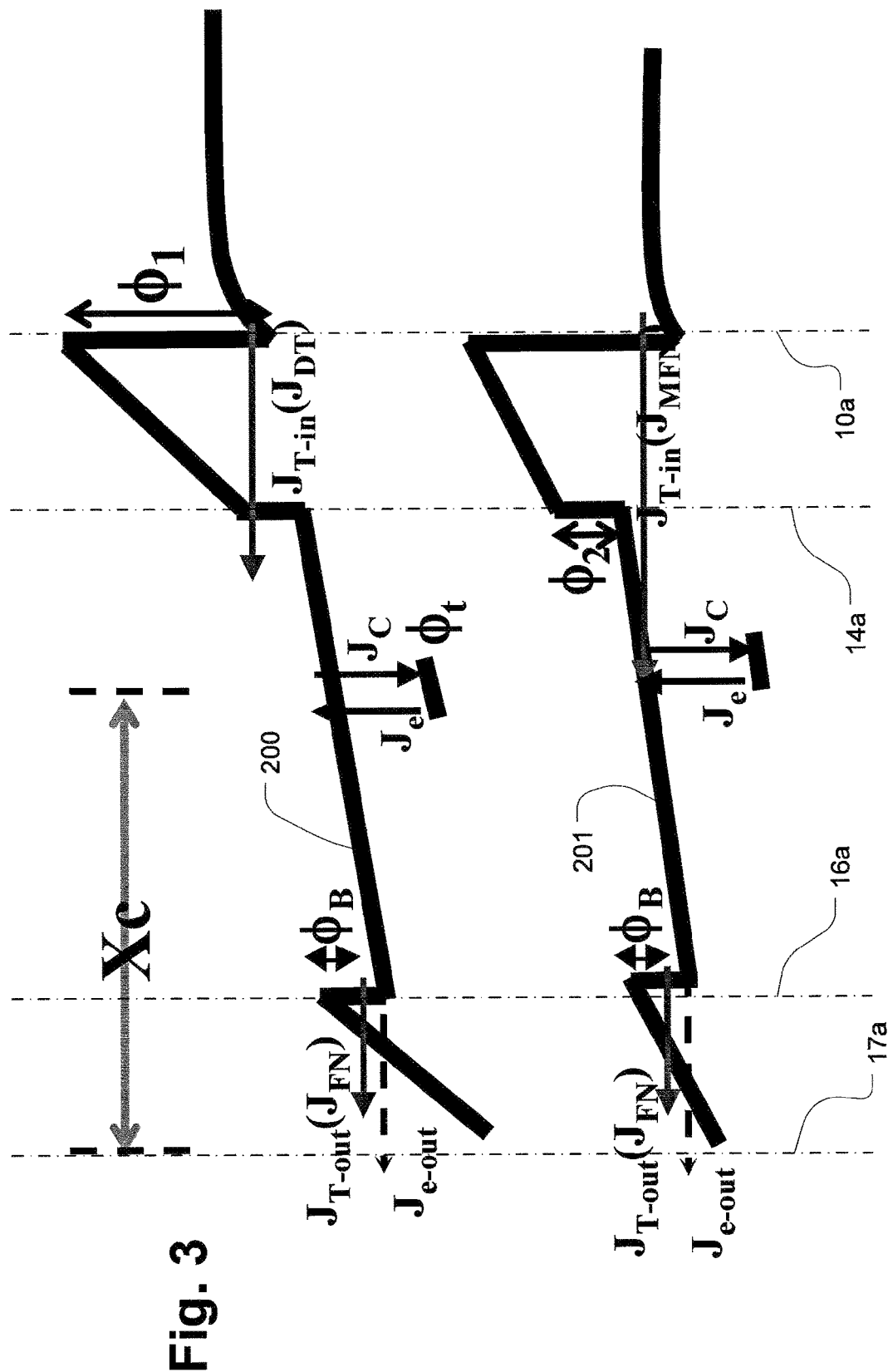
FIG. 3 shows a band diagram and tunneling currents under an intermediate electric field condition and under a low electric field condition for any charge trapping memory cell as described herein.

FIG. 3 includes two traces 200 and 201, illustrating the schematic energy band diagram and current flows under a bias for an intermediate field causing direct tunneling, and a low field causing modified Fowler-Nordheim tunneling, respectively. In a high field, the level of the conduction band in the substrate at the substrate-to-tunneling layer interface 10a intersects the conduction band in the tunneling layer before the charge trapping layer interface 14a, forming a triangular shape characteristic of Fowler-Nordheim FN tunneling. A triangular shape of this type is seen in the blocking layer where $J_{T-out}$ tunnels by Fowler-Nordheim tunneling to the gate. As can be seen in trace 200, the level of the conduction band in the substrate at the substrate-to-tunneling layer interface 10a intersects the vertical line at the tunneling layer to charge trapping layer interface 14a, forming a trapezoidal shape characteristic of direct tunneling DT. In trace 201, the level of the conduction band in the substrate at the substrate-to-tunneling layer interface 10a intersects the conduction band in the tunneling layer at a position past the charge trapping layer interface 14a, forming a combination of a triangular shape and a trapezoidal shape characteristic of modified Fowler-Nordheim MFN tunneling.

The five current components shown in FIG. 3 contribute to the computation of the charge trapping, including charge injection current ($J_{T-in}$), part of $J_{T-in}$ which tunnels through the top oxide ($J_{T-out}$), detrapping in the form of Frankel-Poole (FP) emission current ($J_e$), part of Frankel-Poole emission current ($J_e$) that tunnels through the top oxide ($J_{e-out}$), and trapped charge current representing charge trapped in the charge trapping layer ($J_c$).

Charge injection current ($J_{T-in}$) can be decided by different tunneling mechanisms according to the electric field (See, H. Bachhofer et al., J. Appl. Phys. Vol. 89(5), pp. 2791-2800). Due to a fast energy relaxation process (on the order of picoseconds), all the injected electrons behave as conduction band electrons of the storage material before the following processes takes place. Part of $J_{T-in}$ will tunnel through the top oxide ($J_{T-out}$) and its probability depends on the band-gap difference between storage and blocking materials. The rest will be trapped in the nitride ($J_c$). In the meantime, all the trapped charges exhibit the probability to emit via FP emission process ($J_e$) and subsequently tunnel out through the top oxide ($J_{e-out}$). During programming, the trapped electrons will build up potential in the charge trapping layer, which reduces the tunneling layer field but results in the increase of blocking layer field. Therefore, the tunneling current through tunneling and blocking layers will decrease and increase respectively due to the dynamic status of the electric fields. VT shift ($\Delta$VT) saturates when injected current ($J_{T-in}$) equals the total current leaking out ($J_{T-out}+J_{e-out}$). Stored charges can be assumed in the process described herein to be uniformly trapped at a single energy trap level in the center (or near the center) of the nitride layer. Equations 1-8 below represent methods for computing the current components mentioned above, as well as the charge trapped and the change in threshold voltage for a cell.

Parameters for use in the simulation process are stored in memory in the computer system, typically in a table format or set by software. In the simulation process described herein, all the parameters used are well documented or measurable physical parameters, like effective mass of electrons, permittivity or dielectric constant, trap depth and so on, or controllable variables like material choices or thicknesses. Parameters that can be used include:

$m_T$, $m_{CT}$, $m_{BL}$: the effective mass of electrons in the tunnel layer, the charge trapping layer and the blocking layer, respectively.

$\phi_1$, $\phi_2$, $\phi_B$: Band offset between substrate and tunnel layer, between tunnel layer and charge trapping layer, between charge trapping layer and blocking layer, respectively.

$\in_T$, $\in_{CT}$, $\in_B$: permittivity ($\kappa^*\in_0$) in the tunnel layer ($\in_{ox}$ for silicon dioxide), the charge trapping layer ($\in_{SiN}$ for silicon dioxide), and the blocking layer, respectively.

$\nu_E$: frequency of escape attempts q: charge of an electron $E_T$, $E_{CT}$, $E_B$: Magnitude of the electric field in the tunnel layer, the charge trapping layer and the blocking layer, respectively. These values are determined according to well known functions described below.

$V_G$: Applied gate voltage $V_{FB}$: Flat band voltage which is a physical parameter based on doping concentrations and other factors determined by cell structure.

T: Temperature of operation $X_c$: Distance from gate interface to charge centroid within charge trapping layer.

$\phi_t$: Trap depth in charge trapping layer $\hbar$: Reduced Plank's constant $v_t$: Thermal velocity $t_T$: Thickness of tunneling layer $t_{CT}$: Thickness of charge trapping layer $t_B$: Thickness of blocking layer EOT: Effective oxide thickness of tunneling layer, charge trapping layer and blocking layer combined.

T: Length of program pulse for iteration $Q_{CT}$: The trapped charge for the cell is computed according to Equation 1, below:

$$Q_{CT} = \int [J_{T-in} - J_{T-out} - J_{e-out}] dt \quad \text{Equation 1:}$$

Equation 1 is integrated over a time t=0 to t=T, where T is the length of time for each time step for the process. For many time intervals, the value of $Q_{CT}$ is accumulated to provide a total charge trapped for a simulation run.

$J_{T-in}$: Equations 2, 3 and 4 below can be used to compute the tunneling current into the charge trapping layer, with the equation used being chosen by respective ranges of gate voltage and therefore $E_T$, and the band offsets at the substrate interface 10a and at the interface 14a between the tunneling layer and the charge trapping layer.

Equation 2:

$$J_{FN} = \frac{q^3}{16\pi^2 \hbar \varphi_1} \times E_T^2 \times \exp\left(-\frac{B_1}{E_T}\right),$$

$$\text{where } B_1 = \frac{4}{3} \frac{\sqrt{2m_T}}{q\hbar} \varphi_1^{3/2}$$

Equation 3:

$$J_{DT} = \frac{q^3}{16\pi^2 \hbar \phi_1} \cdot E_T^2 \cdot \exp\left(-\frac{B_2}{E_T}\right),$$

$$\text{where } B_2 = B_1 \cdot \left(1 - \left(\frac{E_T \cdot t_T}{\phi_1}\right)\right)^{3/2}$$

Equation 4:

$$J_{MFN} = \frac{q^3}{16\pi^2 \hbar \phi_1} \cdot E_T^2 \cdot \exp\left(-\frac{B_2}{E_T}\right) \cdot \exp\left(-\frac{B_3}{E_{CT}}\right),$$

$$\text{where } B_3 = \frac{4}{3} \frac{\sqrt{2m_{CT}}}{q\hbar} (\phi_1 - \phi_2 - E_T \cdot t_T)$$

$J_{T-out}$: Equation 5 can be used to compute the tunneling current out of the charge trapping layer to the gate.

Equation 5:

$$J_{T-out} = J_{T-in} \cdot P_{tun}, \text{ where } P_{tun} = \exp\left(-\frac{4}{3} \frac{\sqrt{2m_B}}{q\hbar E_B} \phi_B^{3/2}\right)$$

$J_{e-out}$ and $J_e$: The tunneling current escaping from traps in the charge trapping layer and tunneling out to the gate can be computed by Equation 6.

Equation 6:

$$J_{e-out} = J_e * P_{tun}$$

$$= \left(Q_{CT} \cdot \nu_E \cdot \exp\left(-\frac{\phi_t - q\sqrt{\frac{qE_{CT}}{\pi\varepsilon_{CT}}}}{kT}\right)\right) \cdot P_{tun}$$

where $\nu_E$ is the frequency of attempts to escape by the electrons.

$J_C$: The captured current density can be computed by Equation 7.

$$J_C = J_{T\text{-}in} - J_{T\text{-}out} - J_{e\text{-}out}$$

Equation 7:

The change in threshold voltage $\Delta V_T$ for the cell as a result of the trapped charge can be computed by Equation 8.

Equation 8:

$$\Delta V_T = \frac{Q_{CT}}{\varepsilon_T / X_C}$$

The electric fields $E_T$, $E_{CT}$, $E_B$ in the charge trapping device can be determined as a function of the electric field E1 in the blocking layer due to applied bias, the electric field E2 in the charge trapping layer under applied bias, the electric field in the tunneling layer (E1 if the blocking layer and the tunneling layer are the same material such as silicon oxide) under applied bias, the electric field E4 from the gate to charge centroid due to trapped charge and the electric field E3 from the substrate to the charge centroid due to trapped charge. E1 and E2 can be solved according to Equations 9a and 9b, assuming the tunneling layer, the charge trapping layer and the blocking layer comprise silicon dioxide, silicon nitride and silicon dioxide respectively.

Equations 9a and 9b:

$$Vg = E_1 * t_T + E_2 * \left( t_{CT} * \frac{\varepsilon_{ox}}{\varepsilon_{SiN}} + t_B \right)$$

$$\varepsilon_{ox} * E_1 = \varepsilon_{SiN} * E_2$$

E3 and E4 can be solved according to Equations 10a and 10b, assuming the tunneling layer, the charge trapping layer and the blocking layer comprise silicon dioxide, silicon nitride and silicon dioxide respectively.

Equations 10a and 10b:

From Gauss's law.

$$\begin{cases} \varepsilon_{ox} * E_3 + \varepsilon_{SiN} * E_4 = Q_N \\ E_3 * t_N = E_4 * \left( t_{CT} * \frac{\varepsilon_{ox}}{\varepsilon_{SiN}} + t_B \right) \end{cases}$$

The electric field $E_T$ in the tunneling layer can be solved given E1 and E3 by Equation 11.

$$E_T = |E_1 - E_3|$$

Equation 11:

The electric field $E_B$ in the blocking layer can be solved given E1 and E4 by Equation 12.

$$E_B = |E_1 - E_4|$$

Equation 12:

The electric field $E_{CT}$ in the charge trapping layer can be solved given E2 and E4 by Equation 13.

$$E_{CT} = |E_4 + E_2|$$

Equation 13:

More complex tunneling and blocking layers may be simulated as well, including multilayer tunneling layers and multilayer blocking layers, by expanding the equations for computing the tunneling-in and tunneling-out currents.

Figure 4:
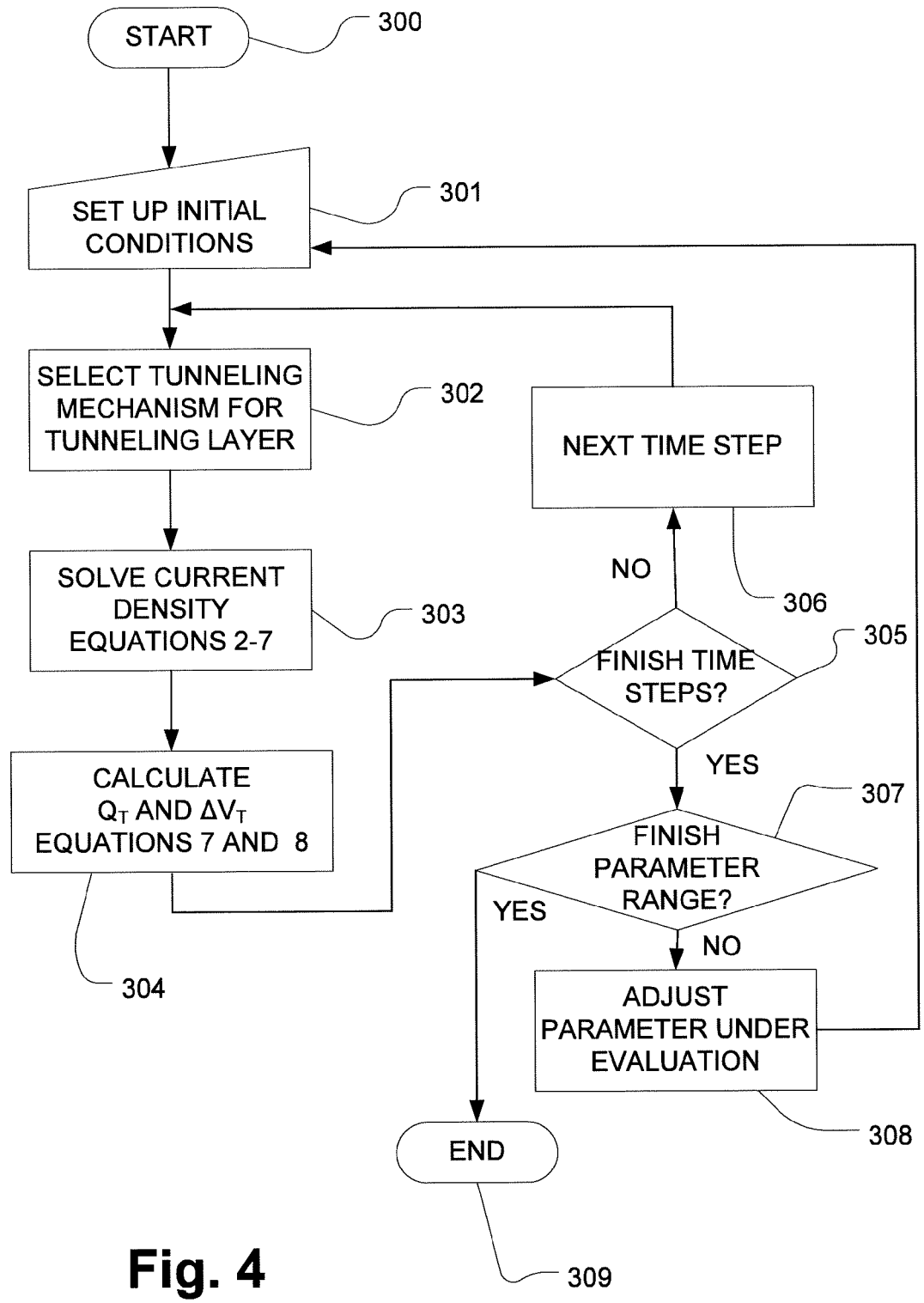
FIG. 4 is a flow chart of a process for simulation and analysis of a memory cell structure as described herein.

FIG. 4 is a basic flow chart for operation of a simulation and analysis tool as described herein. The process begins at block 300. Initial conditions are set up for the analysis to be done (block 301) including loading a parameter set that characterizes the structure of the charge trapping memory device to be analyzed. A parameter set can be input by a user input process, such as a keyboard, can be loaded by software, can be automatically generated based on a set of boundary conditions or can be provided by other sources. In one embodiment, the computer system may include a lookup table which holds parameters for the process, and which is indexed by the names of materials used and the thicknesses of the layers used. The parameters that can be utilized in a process flow are listed above, and include parameters that characterize the materials used for the tunneling layer, the charge trapping layer, and blocking layer, parameters that characterize the thicknesses of those layers, and parameters that specify the voltages applied or electric fields produced during a programming, erasing, or read disturb conditions.

After setting up the initial conditions, the tunneling mechanism which dominates during a programming cycle is determined based on a characterization of the charge trapping structure (block 302). A specific example of an algorithm for determining the tunneling mechanism is described in more detail below. Basically, under conditions of a high range of electric field through the tunneling layer where the conduction band level in the substrate becomes higher than the conduction band in the tunneling layer near the interface 14a with the charge trapping layer so that the tunneling barrier can be characterized as triangular, Fowler-Nordheim FN tunneling is the dominant tunneling mechanism, and the tunneling current can be characterized by Equation 2. Under conditions of an intermediate range of electric field where the conduction band level in the substrate is lower than the conduction band in the tunneling layer at the interface 14a with the charge trapping layer so that the tunneling barrier can be characterized as trapezoidal, direct tunneling DT is the dominant tunneling mechanism, and the tunneling current can be characterized by Equation 3. Under conditions of a low range of electric field where the conduction band level in the substrate becomes lower than the conduction band in the charge trapping layer near the interface 14a with the tunneling layer so that the tunneling barrier can be characterized as a combination of trapezoidal and triangular, and modified Fowler-Nordheim tunneling MFN mechanism dominates and can be characterized by Equation 4.

In a next step, the selected one of Equations 2-4 and Equations 5 and 6 are solved (block 303). Then using the results of the current density equations, the amount of charge trapped and of the change in threshold voltage can be calculated using Equations 7 and 8 for this iteration (block 304). These values are stored and the algorithm determines whether all of the time steps for the program pulse specified during the initial conditions set up have been performed (block 305). If not, then the time parameter is incremented (block 306) and the process returns to block 302. If at block 305, all the time steps have been executed, then optionally in a case in which parameters other than the length of a program, erase or read pulse are being evaluated, the algorithm proceeds to block 307 to determine whether a parameter range under evaluation has been completed. For example, a thickness of the tunneling layer could be changed, a material used for the charge trapping layer or the tunneling layer or the blocking layer might be changed with resulting changing of parameters that characterized the material, or other selected parameters such as band offset might be changed in this step. If at block 307, the steps through the selected parameter range have not been completed, then the parameter under evaluation is adjusted at block 308, and the process returns to block 301 to update the initial conditions according to the changed parameter. If at block 307, the range has been completed, then the process ends at block 309. Further processing can be conducted to determine an optimum value or suitable ranges of values for the parameter under evaluation. In addition, a wide variety of parameters can be evaluated using this technique in an iterative fashion to determine an optimum design for a charge trapping structure.

Pseudo code for selecting a tunneling mechanism as referred to above with respect to block 302, follows:

---
If $(E_T * t_B > \phi_1)$, then use Equation 2;
Else, if $(E_T * t_B > \phi_1 - \phi_2)$, then use Equation 3;
Else use Equation 4.

---

According to the process reflected in the pseudo code above, the simulation tool includes logic for selecting in response to a thickness of the tunneling layer, band offset between the tunneling layer and a substrate, a band offset between the tunneling layer and the charge trapping layer, and a magnitude of an electric field in the tunneling layer, one of a Fowler-Nordheim tunneling mechanism, a direct tunneling mechanism and a modified Fowler-Nordheim tunneling mechanism to be applied in the determining the tunneling current $J_{T-in}$ into the charge trapping layer.

Figure 5:
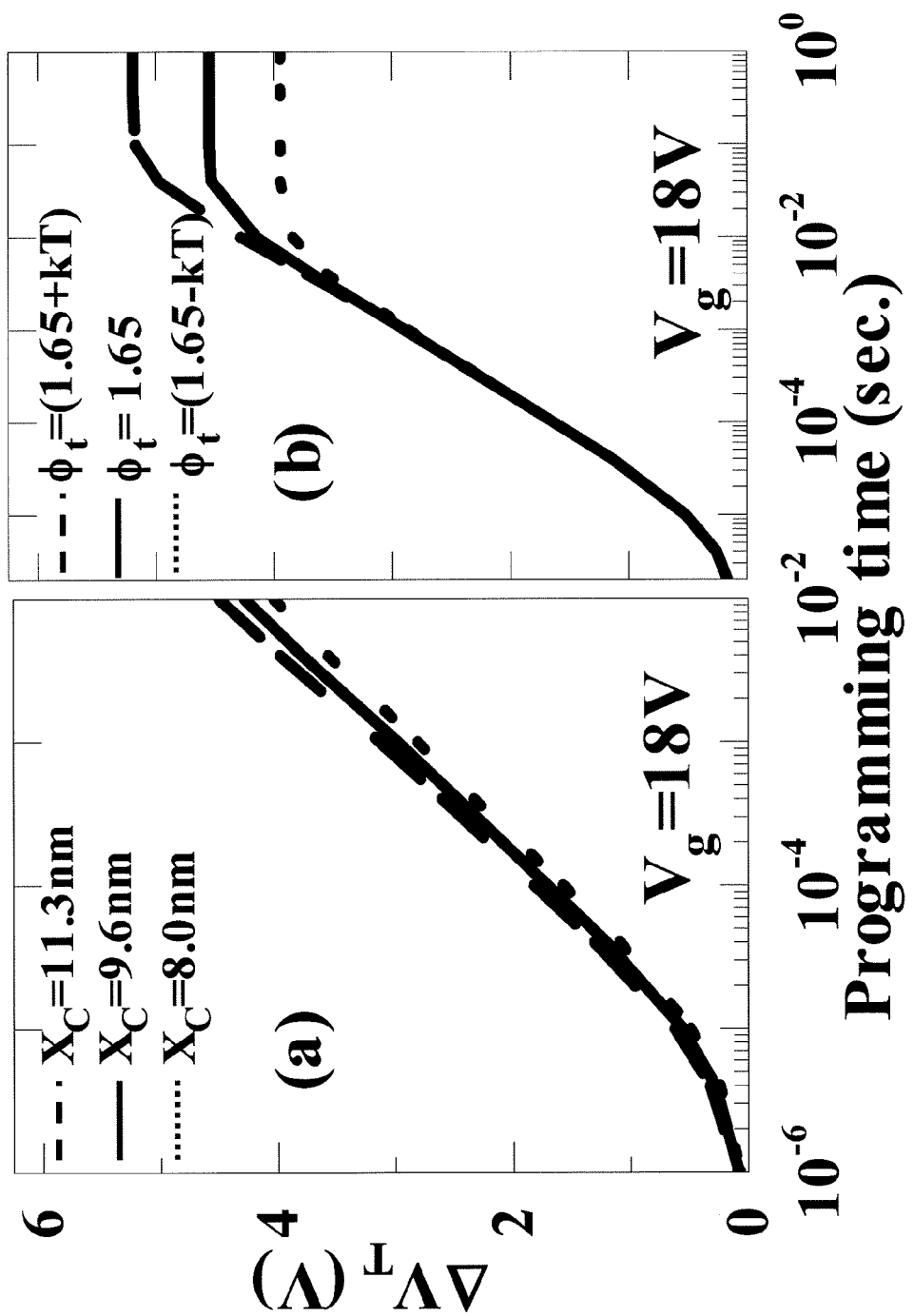
FIG. 5 shows a graph on the left of simulated change in threshold voltage versus program time with different charge centroid positions and a graph on the right of simulated change in threshold voltage versus program time with different charge trapping depths.

FIG. 5 shows plots of $\Delta V_T$ versus programming time for different charge centroid positions $X_C$ on the left, and for different charge trapping depths $\phi_t$ on the right. As shown in FIG. 5, the influence of charge centroid position (Xc) in program transient is negligible. In the simulations described herein, the Xc can be fixed, such as at or near the middle of the charge trapping layer, and the depth of traps can be accurately extracted during a fitting process based on the strong energy related, $\Delta V_T$ saturation effect. Any arbitrary position of the centroid can be selected that falls within the charge trapping layer can be used and useful results can be obtained. However, as shown in the right side plot, a moderate variation of the trap depth $\phi_t$ is found to exhibit significant impact on the saturation level with little difference regarding program speed. The trap depth $\phi_t$ for a given simulation can be determined empirically by matching simulation results to measured results, or chosen from literature. For an ONO charge trapping structure (silicon dioxide, silicon nitride, silicon dioxide) under high electric field, the trap depth can be set at about 1.65 eV. Increase of trap depth reduces Frankel-Poole emission and results in a higher saturation value.

Figure 7:
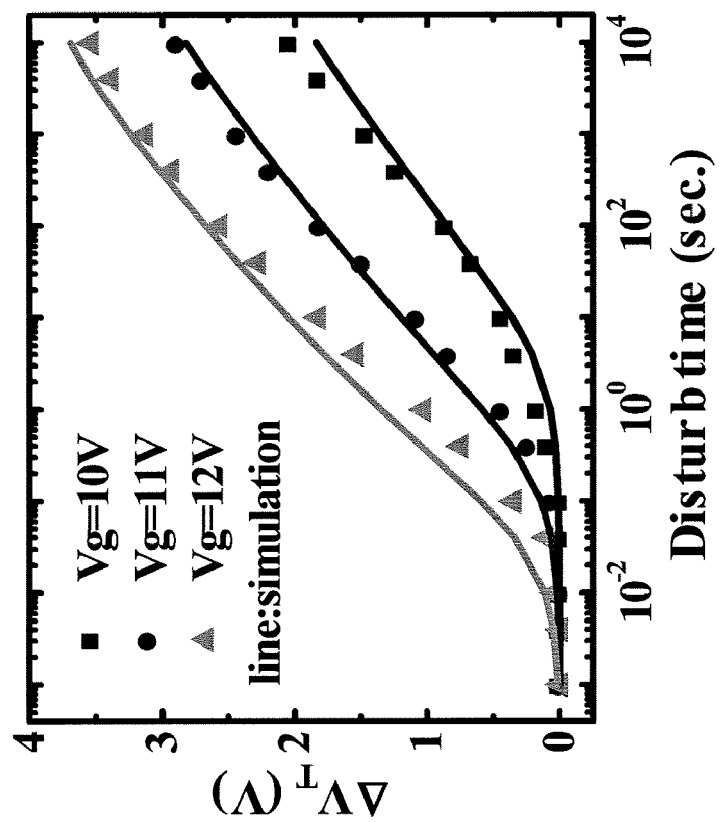
FIG. 7 is a graph of change in threshold voltage versus "disturb" time showing simulated and measured results for changing gate voltages.
Figure 6:
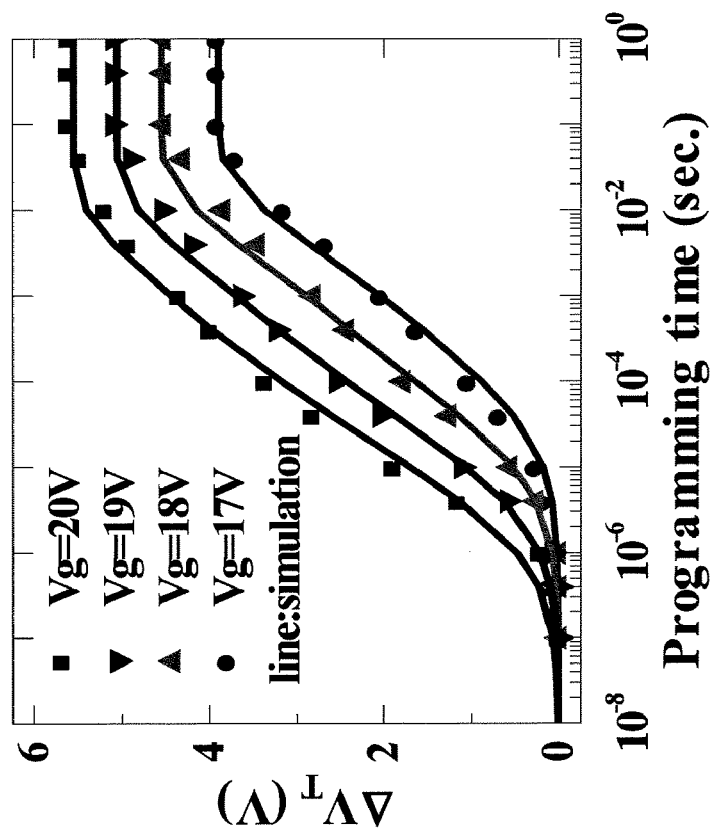
FIG. 6 is a graph of change in threshold voltage versus programming time showing simulated and measured results for a changing gate voltages.

Inspection of results under various gate biases shown in FIG. 6 ($V_G$ from 17V to 20V for high field conditions such as encountered in program operations) and FIG. 7 ($V_G$ from 10V to 12V for moderate field conditions such as encountered in program or erase disturb conditions that occur during programming of neighboring cells) reveals a good agreement between experiments (plotted using shaped dots) and simulations (plotted using lines). Note that, 1V increase of gate voltage does not result in 1V additional $V_T$ shift but only 0.7V. Lower gate voltages may be simulated as well to approximate read disturb conditions, if desired.

Figure 8:
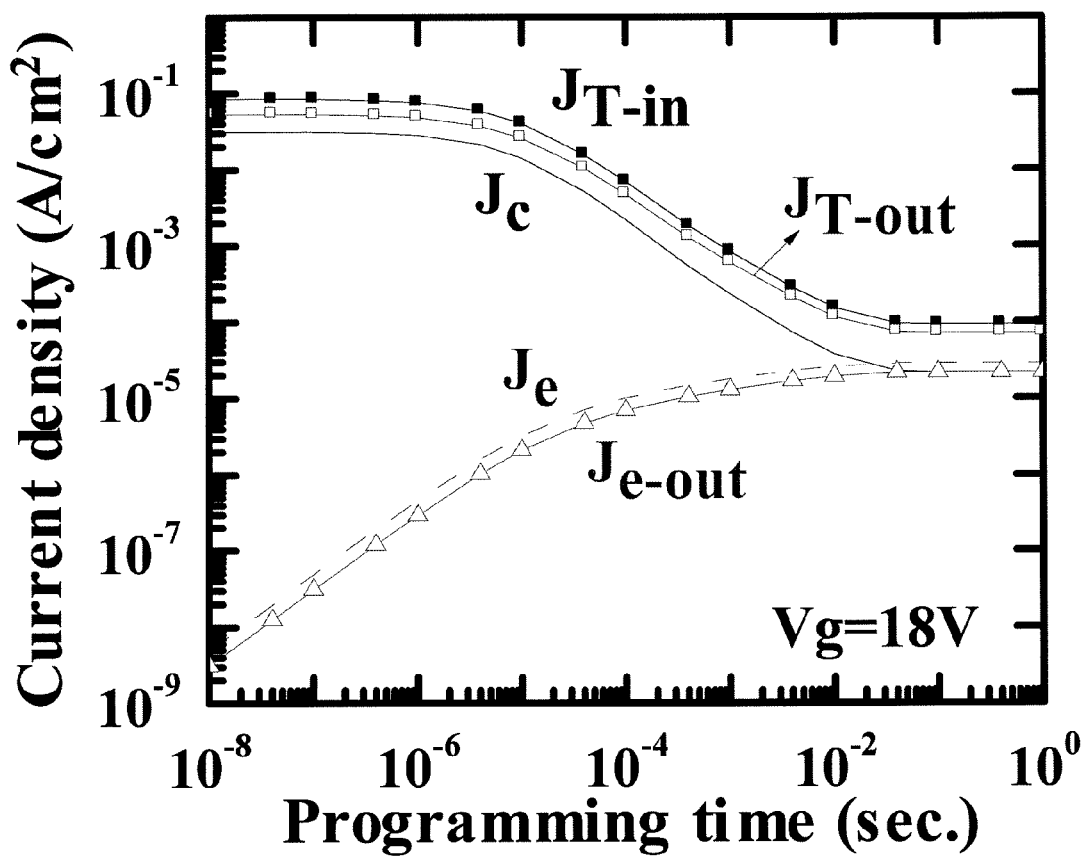
FIG. 8 is a graph showing the simulated magnitude of current density for each of the five current components versus programming time for a fixed gate voltage of about 18 V.

The detailed plots for the five current components are shown in FIG. 8. This illustrates that the saturation phenomenon reaches balance by the tunneling out process ($J_{T-out}$ and $J_{e-out}$) in the simulations described herein, rather than the Frankel-Poole detrapping mechanism, as suggested in H. Bachhofer et al., J. Appl. Phys. Vol. 89(5), pp. 2791-2800.

Figure 9:
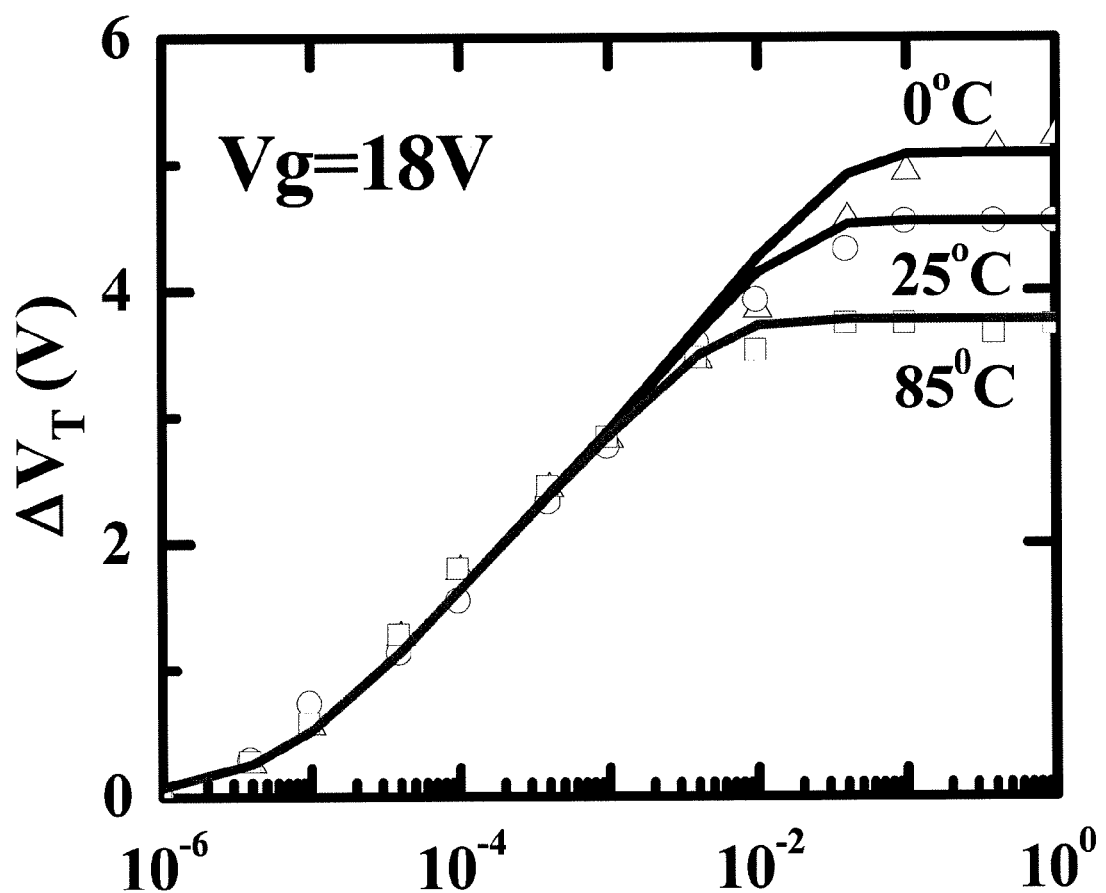
FIG. 9 shows measured and simulated results for change in threshold voltage at different temperatures with a fixed gate voltage of about 18 V.

FIG. 9 shows the temperature effect on the program transient, with measured results plotted as shaped dots and simulation results plotted as lines. As predicted by the device simulation, the program speed is similar at various temperatures. However, a higher saturation level is obtained at lower temperatures.

Figure 10:
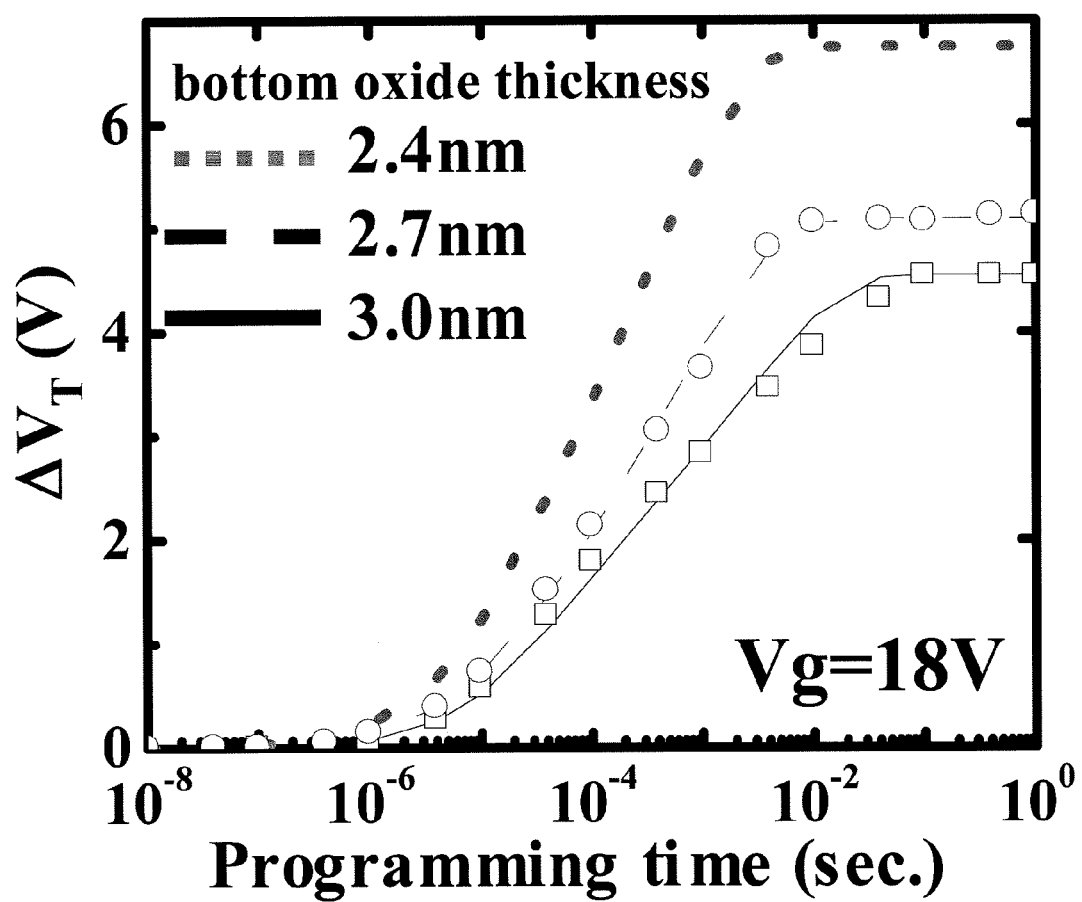
FIG. 10 shows simulated results for change in threshold voltage versus programming time at a fixed gate voltage of about 18 V for three different tunneling layer thicknesses, along with measured results for tunneling layer thicknesses of 2.7 nm and 3.0 nm.
Figure 11:
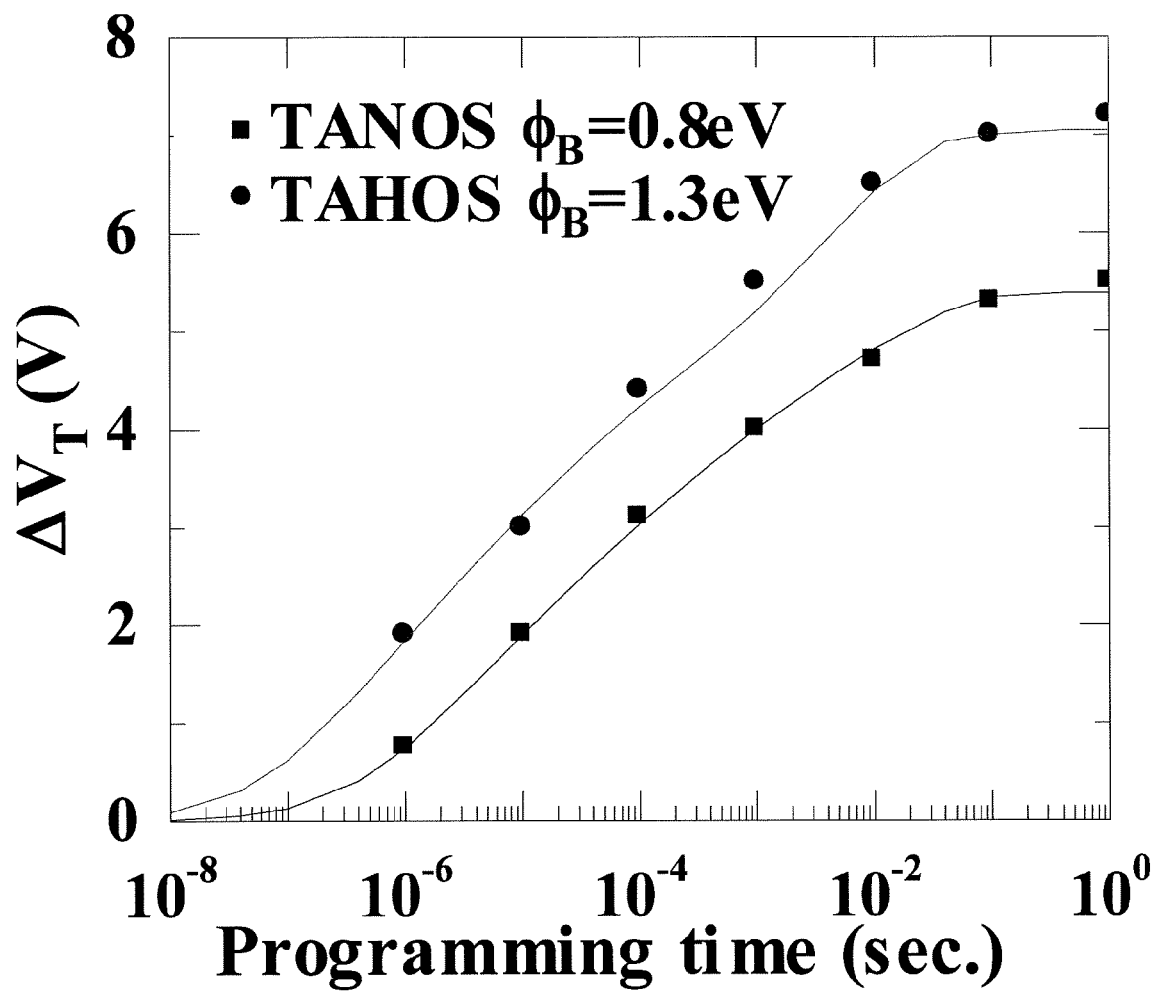
FIG. 11 shows simulated results for change in threshold voltage versus programming time for TANOS (tantalum nitride, aluminum oxide, silicon nitride, silicon oxide, silicon) and TAHOS (tantalum nitride, aluminum oxide, hafnium oxide, silicon oxide, silicon) charge trapping cells, along with data points taken from the literature for comparison.

FIG. 10 shows the results of simulation of reducing the thickness $t_1$ of the tunneling layer to improve the program speed. FIG. 10 shows that when silicon oxide (OX) is the material of the tunneling layer, a 10 times faster speed is achieved when the thickness of the tunneling oxide layer scales from 3 nm to 2.4 nm. (Note that experimental results were not available to compare simulation results at 2.4 nm tunneling layer thickness.) Based on this model, the tunneling barrier plot in an energy band diagram will transfer from a triangle (high field condition and FN tunneling) under program bias with a thin layer to a trapezoid (intermediate field condition and direct tunneling) with a thicker layer, which can explain the change in program speed. However, in FIG. 10, a wider program $V_T$ distribution is observed for a thinner bottom oxide even though both cases exhibit a similar initial $V_T$ distribution. In FIG. 11, the simulation shows that the thickness variation of a 2.7 nm oxide leads to more impact on the $\Delta V_T$ distribution as compared to a 3.0 nm case even though the controllability of both conditions is similar ($\Delta t_{OX}/t_{OX}$ fixed). The situation becomes even worse in real case, in which $\Delta t_{OX}$ instead of $\Delta t_{OX}/t_{OX}$ is kept constant. In other words, although switching to direct tunneling mechanism can easily improve the program speed, special attention has to be paid to the impact arising from more sensitivity of direct tunneling behavior to thickness variations in the tunneling layer.

Figure 12:
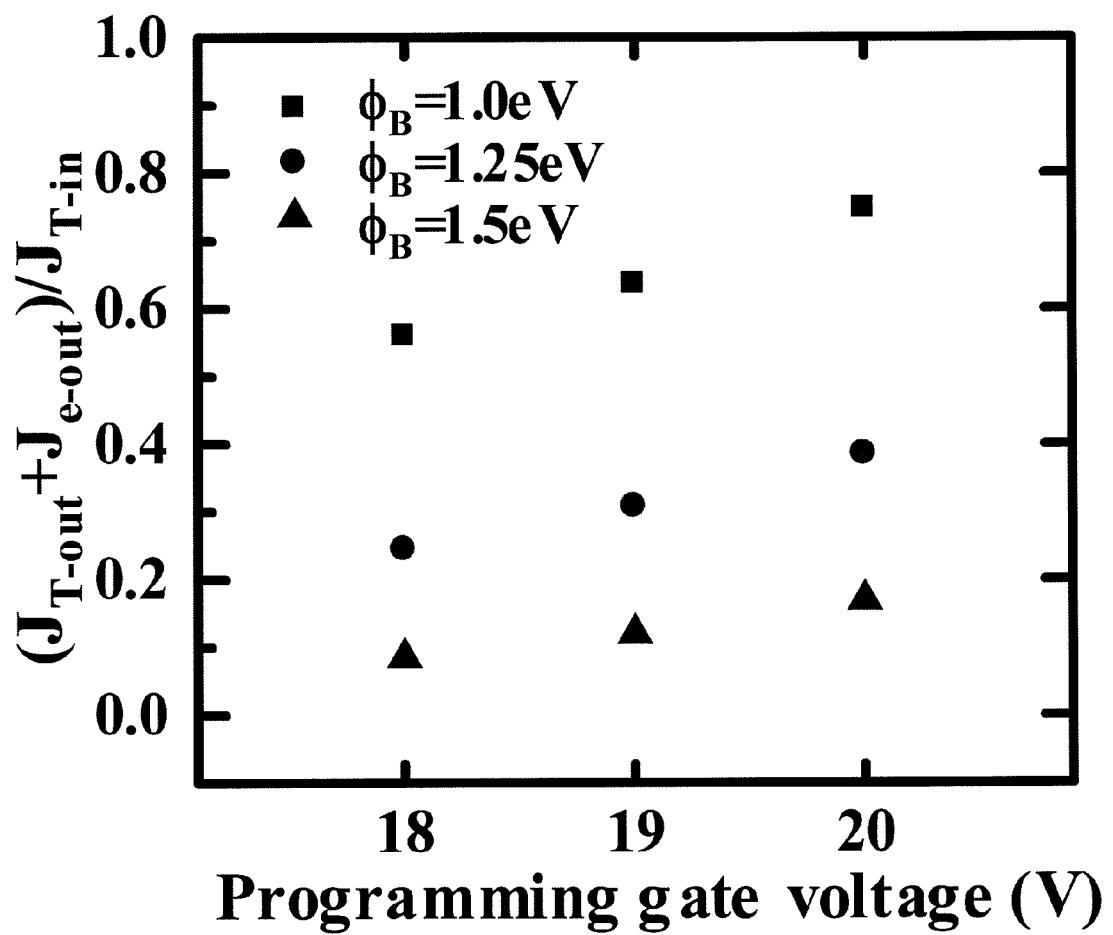
FIG. 12 is a graph of the ratio of simulated tunneling-out current to tunneling-in current for various band offset values for the interface between the charge trapping layer and the blocking layer of a charge trapping structure.

FIGS. 11 and 12 show the impact of the conduction band offset $\phi_B$. Data points derived from FIG. 5 in Y. Q. Wang et al., IEEE Trans. On Electron Devices, Vol. 54(10), 2007 are shown in FIG. 11 for comparison with the output of the simulation tool. The $\phi_B$ affects the $\Delta V_T$ saturation level, such that a lower $\phi_B$ results in lower program saturation levels. In FIG. 12, the ratio between ($J_{T-out}+J_{e-out}$) and $J_{T-in}$ is plotted using the simulation program described herein, while increasing $\phi_B$ from 1.0 eV to 1.5 eV. Thus, according to this simulation result, increasing $\phi_B$ higher than 1.5 eV would be expected to substantially suppress the leakage current from the top layer.

Figure 13:
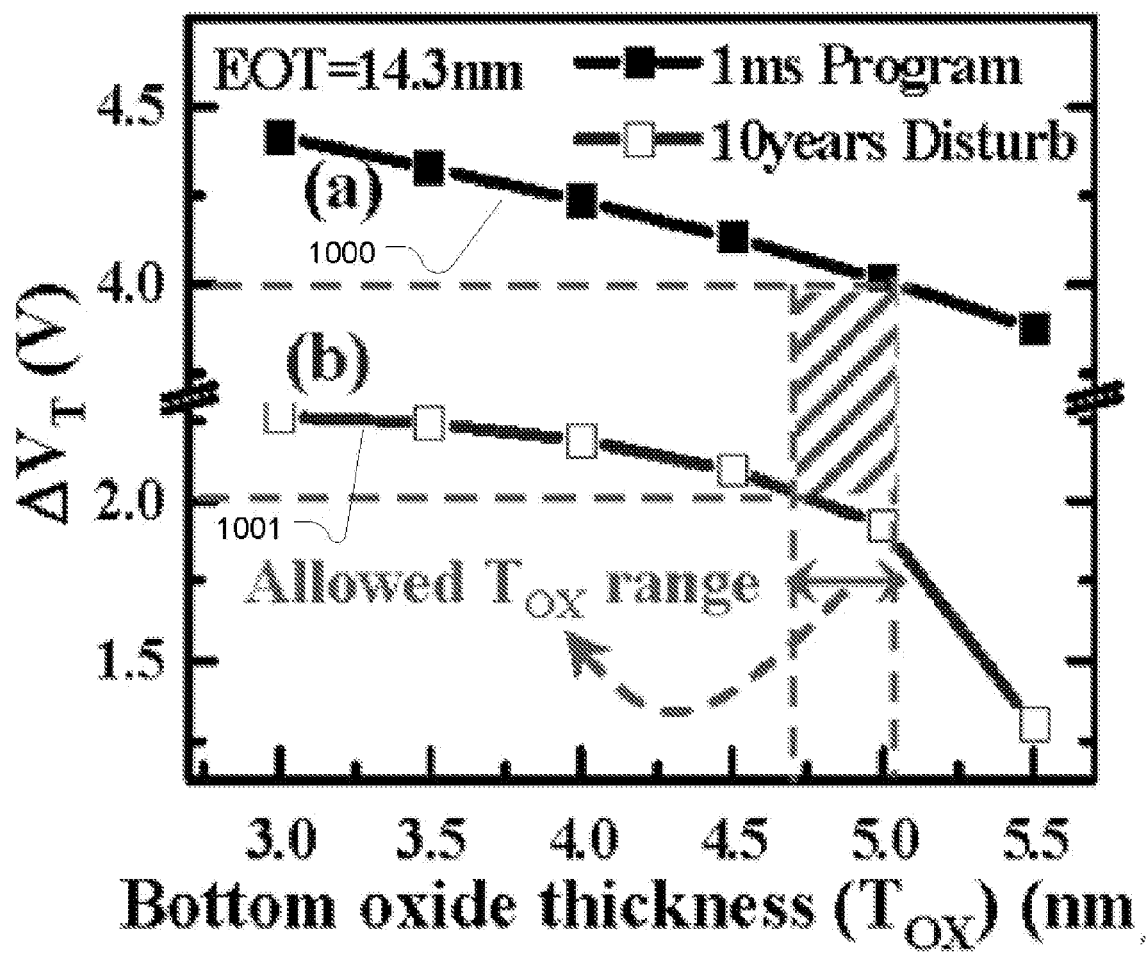
FIG. 13 is a graph showing application of the design tool described herein for determining a preferred range of thickness for a tunneling layer.

FIG. 13 is a graph showing how the tool described herein can be used to define a suitable thickness for a tunneling layer during a memory cell design process, assuming a given EOT (14.3 nm) for the charge trapping structure. Trace 1000 shows a plot of the results of simulation of a 1 ms program pulse of the selected pulse height, as the thickness of the tunneling layer (horizontal axis) is varied through a specified range, which in this example is about 3 nm to about 5.5 nm. Trace 1001 is a plot of the results of simulation of read disturb conditions, where a read voltage of a specified pulse height and pulse width is defined, as the thickness of the tunneling layer is varied through the specified range. For a programming specification requiring a change in threshold voltage of more than 4 V, and a disturb specification requiring that the change in threshold voltage after 10 years operation should be less than 2 V, a range of thicknesses can be determined. Specifically, the threshold voltage change for the 1 msec program pulse is more than 4 V starting with a tunneling layer thickness of about 5 nm, setting an upper range on the thickness of the tunneling layer. The threshold voltage change under the 10 year disturb condition is less than 2 V for tunneling layer thickness greater than about 4.7 nm. A suitable thickness for the tunneling layer according to the specification falls between 4.7 and 5.0 nm.

In summary, a design tool is described which performs a computer implemented simulation process that models charge trapping behavior under programming conditions designed to increase the trapped electrons to raise the threshold voltage of a charge trapping cell. The tool utilizes physical parameters based on characteristics of the charge trapping structure, and computes trapped charge and change in threshold voltage using the difference between the tunneling-in current and the tunneling-out current, including taking into account a component of tunneling-out current attributed to de-trapping of charge during the program operation.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computer implemented method for simulation of charge trapping in a charge trapping structure having a tunneling layer, a charge trapping layer and blocking layer; comprising:
   storing in a machine readable medium a parameter set characterizing materials and thicknesses of the tunneling layer, a charge trapping layer and blocking layer;
   computing charge trapped in the charge trapping layer as a function of the parameter set, said computing charge trapped in the charge trapping layer including determining first tunneling current through the tunneling layer, determining a second tunneling current out of the charge trapping layer to the gate, determining a third tunneling current escaping from traps in the charge trapping layer and tunneling out to the gate, and integrating said tunneling currents over a time interval.

2. The method of claim 1, including computing a change in threshold voltage for a transistor including the charge trapping structure using the computed charge trapped.

3. The method of claim 1, wherein said parameter set includes a first band offset between the substrate and the tunneling layer, a second band offset between the charge trapping layer and the tunneling layer, and a third band offset between the charge trapping layer and the blocking layer.

4. The method of claim 1, including iteratively computing the amount of charge trapped while changing a selected parameter in the parameter set to characterize results on charge trapping of changing the selected parameter.

5. The method of claim 1, wherein said computing charge trapped includes applying a constant charge centroid position having a location within the charge trapping layer.

6. The method of claim 1, including selecting in response to the parameter set a tunneling mechanism to be applied in determining the first tunneling current.

7. The method of claim 1, including selecting in response to a thickness of the tunneling layer, band offset between the tunneling layer and a substrate, a band offset between the tunneling layer and the charge trapping layer, and a magnitude of an electric field in the tunneling layer, one of a Fowler-Nordheim tunneling mechanism, a direct tunneling mechanism and a modified Fowler-Nordheim tunneling mechanism to be applied in the determining the first tunneling current.

8. An automated design tool which simulates charge trapping in a charge trapping structure having a tunneling layer, a charge trapping layer and blocking layer; comprising:
   a processor including machine readable memory storing a parameter set characterizing materials and thicknesses of the tunneling layer, a charge trapping layer and blocking layer;
   a computer program stored in the machine readable memory, which includes instructions to compute charge trapped in the charge trapping layer as a function of the parameter set, said instructions to compute charge trapped in the charge trapping layer including logic for determining first tunneling current through the tunneling layer, logic for determining second tunneling current out of the charge trapping layer to the gate, logic for determining third tunneling current escaping from traps in the charge trapping layer and tunneling out to the gate, and logic for integrating said tunneling currents over a time interval.

9. The design tool of claim 8, said instructions including logic for computing a change in threshold voltage for a transistor including the charge trapping structure using the computed charge trapped.

10. The design tool of claim 8, wherein said parameter set includes a first band offset between the substrate and the tunneling layer, a second band offset between the charge trapping layer and the tunneling layer, and a third band offset between the charge trapping layer and the blocking layer.

11. The design tool of claim 8, said instructions including logic for iteratively computing the amount of charge trapped while changing a selected parameter in the parameter set to characterize results on charge trapping of changing the selected parameter.

12. The design tool of claim 8, wherein said instructions to compute charge trapped include logic for applying a constant charge centroid position having location within the charge trapping layer.

13. The design tool of claim 8, said instructions including logic for selecting in response to the parameter set a tunneling mechanism to be applied in determining the first tunneling current.

14. The design tool of claim 8, said instructions including logic for selecting in response to a band offset between the tunneling layer and a substrate, a band offset between the tunneling layer and the charge trapping layer, and a magnitude of an electric field in the tunneling layer, one of a Fowler-Nordheim tunneling mechanism, a direct tunneling mechanism and a modified Fowler-Nordheim tunneling mechanism to be applied in the determining the first tunneling current.

15. An article of manufacture comprising:
   machine readable memory storing a computer program for automated design which simulates charge trapping in a charge trapping structure having a tunneling layer, a charge trapping layer and blocking layer, using a parameter set characterizing materials and thicknesses of the tunneling layer, a charge trapping layer and blocking layer;
   said computer program including instructions to compute charge trapped in the charge trapping layer as a function of the parameter set, said instructions to compute charge trapped in the charge trapping layer including logic for determining a first tunneling current through the tunneling layer, logic for determining a second tunneling current out of the charge trapping layer to the gate, logic for determining a third tunneling current escaping from traps in the charge trapping layer and tunneling out to the gate, and logic for integrating said tunneling currents over a time interval.

16. The article of manufacture of claim 15, said instructions including logic for computing a change in threshold voltage for a transistor including the charge trapping structure using the computed charge trapped.

17. The article of manufacture of claim 15, said instructions including logic for iteratively computing the amount of charge trapped while changing a selected parameter in the parameter set to characterize results on charge trapping of changing the selected parameter.

18. The article of manufacture of claim 15, wherein said instructions to compute charge trapped include logic for applying a constant charge centroid position having location within the charge trapping layer.

19. The article of manufacture of claim 15, said instructions including logic for selecting in response to the parameter set a tunneling mechanism to be applied in determining the first tunneling current.

20. The article of manufacture of claim 15, said instructions including logic for selecting in response to a band offset between the tunneling layer and a substrate, a band offset between the tunneling layer and the charge trapping layer, and a magnitude of an electric field in the tunneling layer, one of a Fowler-Nordheim tunneling mechanism, a direct tunneling mechanism and a modified Fowler-Nordheim tunneling mechanism to be applied in the determining the first tunneling current.

* * * * *